Dec. 12, 1961 R. B. HERDEN 3,012,471
MOTION PICTURE CAMERA AND PROJECTOR CONSTRUCTION
Filed April 16, 1956 5 Sheets-Sheet 2

Dec. 12, 1961 R. B. HERDEN 3,012,471
MOTION PICTURE CAMERA AND PROJECTOR CONSTRUCTION
Filed April 16, 1956 5 Sheets-Sheet 3

United States Patent Office 3,012,471
Patented Dec. 12, 1961

3,012,471
MOTION PICTURE CAMERA AND
PROJECTOR CONSTRUCTION
Robert B. Herden, Webster, N.Y., assignor, by mesne assignments, to Revere Camera Company (formerly Samica Corporation), a corporation of Delaware
Filed Apr. 16, 1956, Ser. No. 578,209
2 Claims. (Cl. 88—16.8)

This invention relates to photographic equipment or apparatus, and more particularly to a motion picture camera.

An object of the invention is the provision of a generally improved and more satisfactory motion picture camera of the type intended for industrial and military application.

Another object is the provision of a simple, sturdy, compact, and relatively light motion picture camera of the kind in which the film moves continuously rather than intermittently.

Still another object is the provision of a simple and satisfactory motion picture camera so designed and constructed as to meet the rather severe space limitation requirements and operational stability requirements demanded of cameras for use in certain special locations, particularly in fast moving things such as guided missiles.

Still another object is the provision of an improved and more satisfactory shuttering arrangement or mechanism for a motion picture camera of the type in which the film moves continuously rather than intermittently.

These and other desirable objects may be attained in the manner disclosed as an illustrative embodiment of the invention in the following description and in the accompanying drawings forming a part hereof, in which.

The same reference numerals throughout the several views indicate the same parts.

The problems involved in providing a satisfactory motion picture camera for use on a vibrating and fast accelerating structure, such as a guided missile, are quite different from those involved in providing a motion picture camera for ordinary use in a stationary location. First, space in a structure such as a guided missile or the like is at a premium, and if it is desired to mount a camera on the missile, the camera must be extremely compact. Second, the camera must be able to withstand very high forces or loads, during initial acceleration of the missile at the time of its launching, and during the rapid deceleration or negative acceleration of the missile at the time it returns to earth, as well as during its passage or travel, when it may rotate, or oscillate, or make other sudden movements. The camera must therefore operate satisfactorily under forces of many times the normal gravitational force, it being desirable to have a camera which will function smoothly and perfectly even if subjected to forces or loads as great as 100 G's or more.

The magnitude of these forces, especially when coupled with the requirement of compactness for space limitation, imposes a very serious design problem. The camera construction of the present invention is intended to solve this problem, although obviously the usefulness of the present camera is not confined to operation under the severe conditions mentioned.

Cameras of the type in which the film moves continuously rather than intermittently are already known, certain features of such cameras being disclosed in the copending United States patent application of Ludwig G. Ranft and Robert B. Herden, Serial No. 523,171, filed July 20, 1955 (now Patent 2,821,106, granted January 28, 1958), and in the copending United States patent application of Robert B. Herden, Serial No. 553,848, filed December 19, 1955, now abandoned. Many features of the present invention are intended particularly for cameras of this general type (i.e. cameras in which the film moves continuously) but other features of the present invention are not confined to any particular type of camera and may be employed in cameras of the conventional kind in which the film moves intermittently.

In its preferred form, the camera of the present invention comprises a main body portion or section 31 containing the film advancing mechanism and the shuttering mechanism. At the front of the section 31, and detachably held thereto as by bolts or screws 33, is the lens mount (not shown) containing the lens, usually consisting of several different elements or components, located on the optical axis of the camera. The details of the lens and its mount are unimportant for purposes of the present invention. Any suitable lens may be used.

Figure 1:
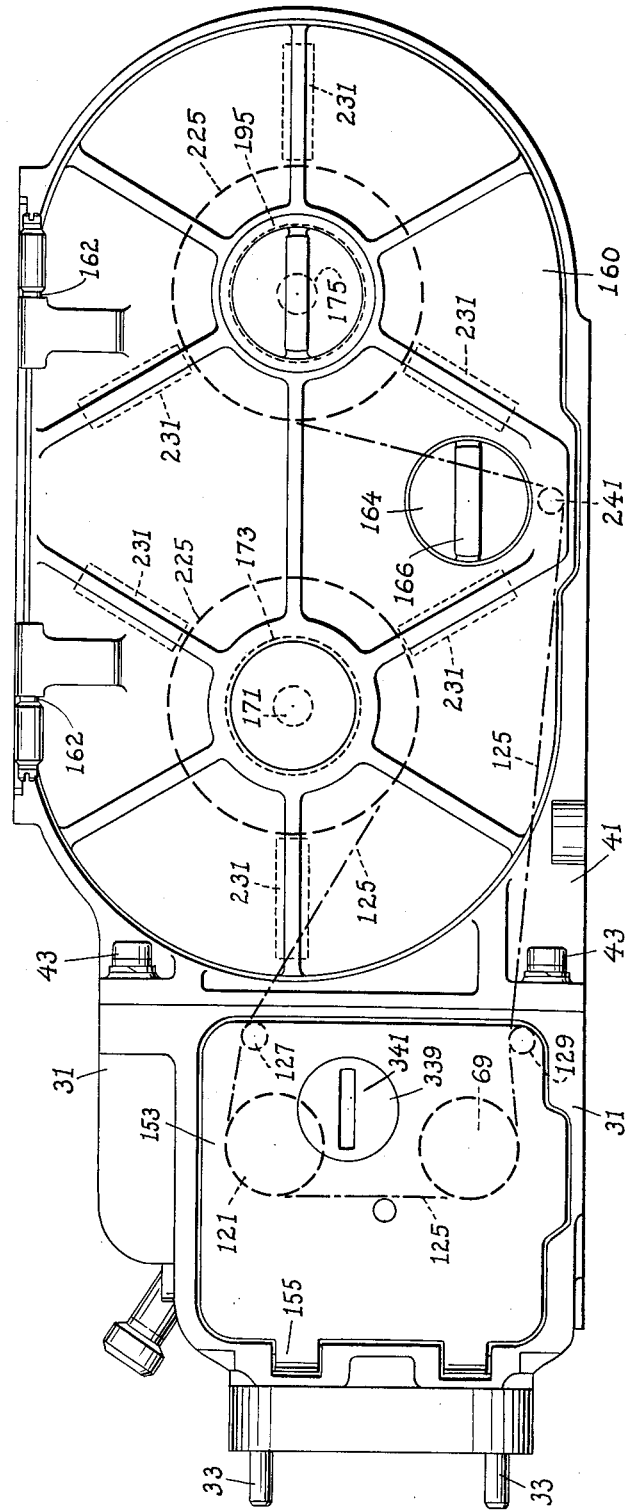
FIG. 1 is a side elevation of a camera (with lens mount removed) in accordance with a preferred embodiment of the invention, viewed from the side in which the access door is located (hereinafter for convenience called the near side of the camera)
Figure 2:
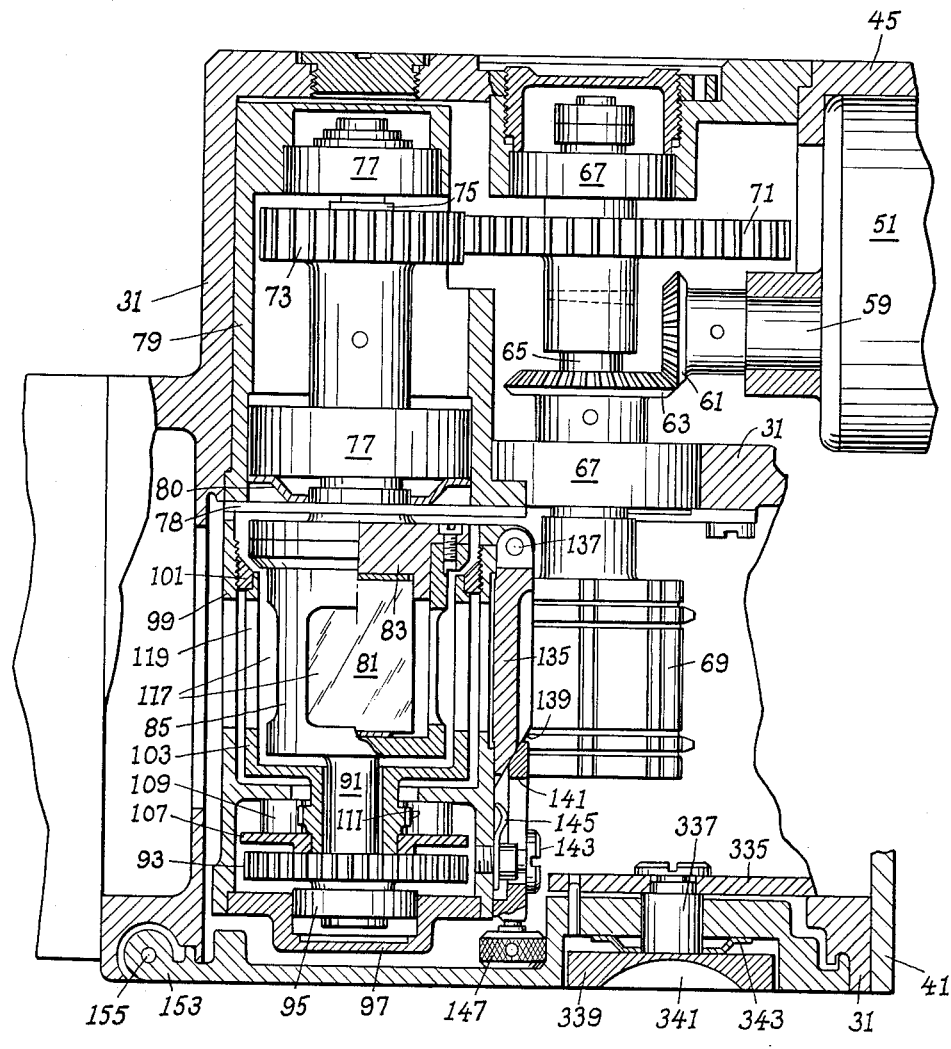
FIG. 2 is a top plan of the camera with parts broken away and parts in horizontal section.

To the rear of the main housing or body portion 31 there is a magazine section or assembly indicated in general at 41, alined with the optical axis and detachably secured to the housing section 31 by means of screws 43. The side of the camera shown in FIG. 1 may for convenience be called the near side, since this is the side which contains the access door for access to the interior of the main body or housing for purposes of threading the film, making any necessary adjustment, etc. The opposite side may for convenience be called the far side of the camera. As best seen in FIG. 2, the major portion of the magazine assembly 41 is thinner than the main body section or main housing 31, thus allowing room for a rearwardly extending section or portion 45 on the main housing 31, which extends along on the far side of the magazine assembly 41 and which contains the power unit or driving motor. The principal sections thus far described, and their internal mechanism, will be individually described in such detail as may be necessary to understand the invention.

The rearward extension 45 of the main housing is internally formed of cylindrical shape, to surround snugly the externally cylindrical housing 51 of an electric motor of the direct current, variable speed type, so that it may be run at various predetermined speeds depending on the photographic results desired.

The motor is equipped with twin speed reduction gearing at either end, the gearing itself being of conventional kind, the details of which are unimportant for present purposes. Each set of reducing gears has a drive shaft, one extending rearwardly and one forwardly from the respective ends of the motor housing. The rear drive shaft (not shown) is detachably coupled to the film take-up spool of the magazine assembly, as will be mentioned below. The front drive shaft 59 carries at its forward end a bevel gear 61 which meshes with a bevel gear 63 on a cross shaft 65 extending transverse to the optical axis and suitably supported in the main housing section 31 by means of ball bearings 67.

The near end of the shaft 65 has fixed to it the film advancing sprocket 69. Also fixed to the shaft 65, in a location between the two ball bearings 67 and on the far side of the bevel gear 63, is a drive gear 71 for driving the shuttering mechanism and optical compensating means.

The optical compensating means or mechanism includes a rotating prism for moving the projected image in synchronism with the moving film, as already known, for example, in said copending application, Serial No. 523,171. But the present mechanism is an improvement on the construction shown in said copending application, in that the present mechanism includes, in addition to the rotating prism and its housing, also a rotating shuttering drum surrounding the prism and serving to limit the projected image to those portions of its sweep in which the moving image can be well synchronized with film travel, and to exclude or cutoff the image in those portions of its sweep wherein it is subject to material distortion or error.

Figure 3:
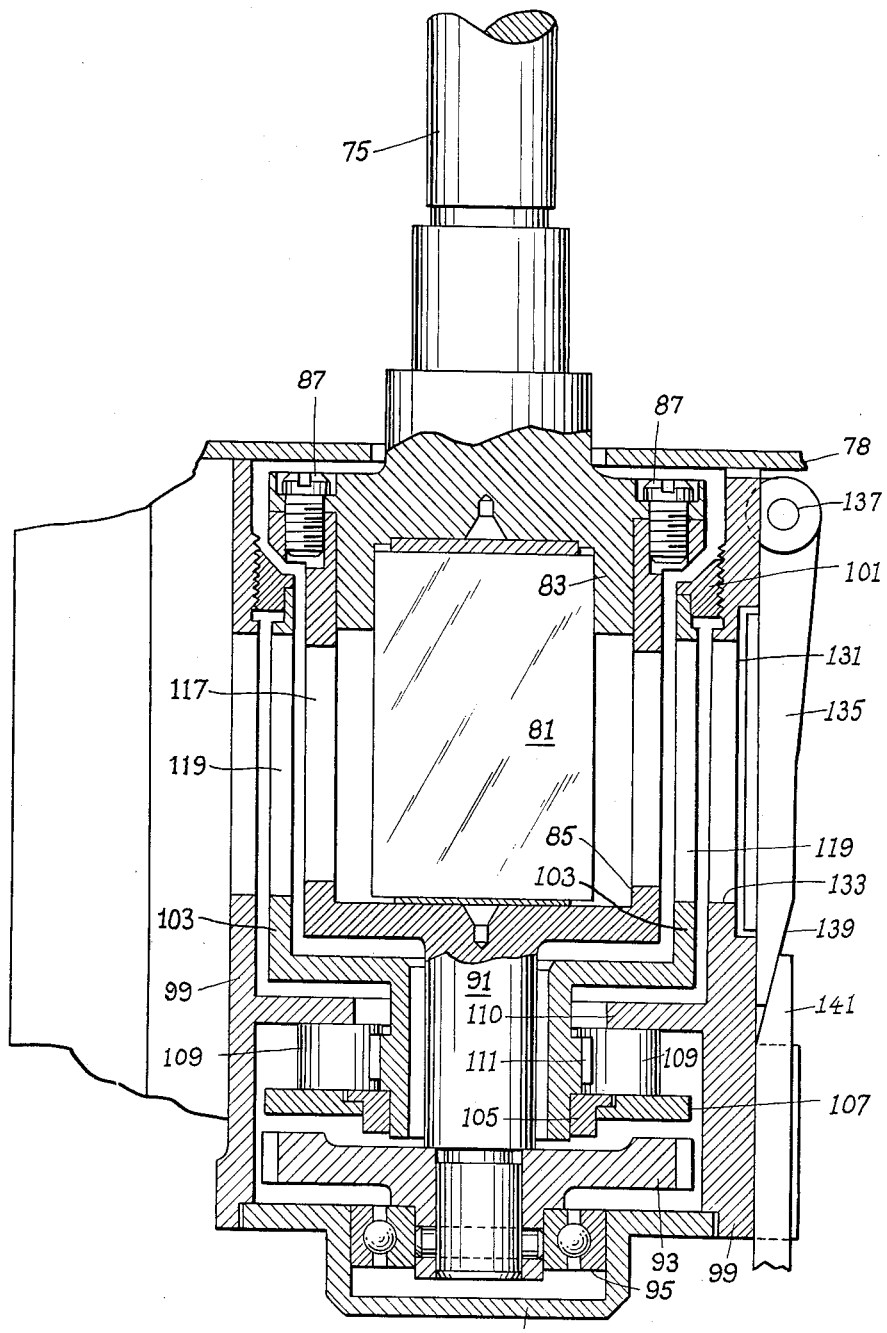
FIG. 3 is an enlarged section through the optical prism and associated shutter and film gate mechanism, the section being taken axially along the axis of rotation of the prism.
Figure 4:
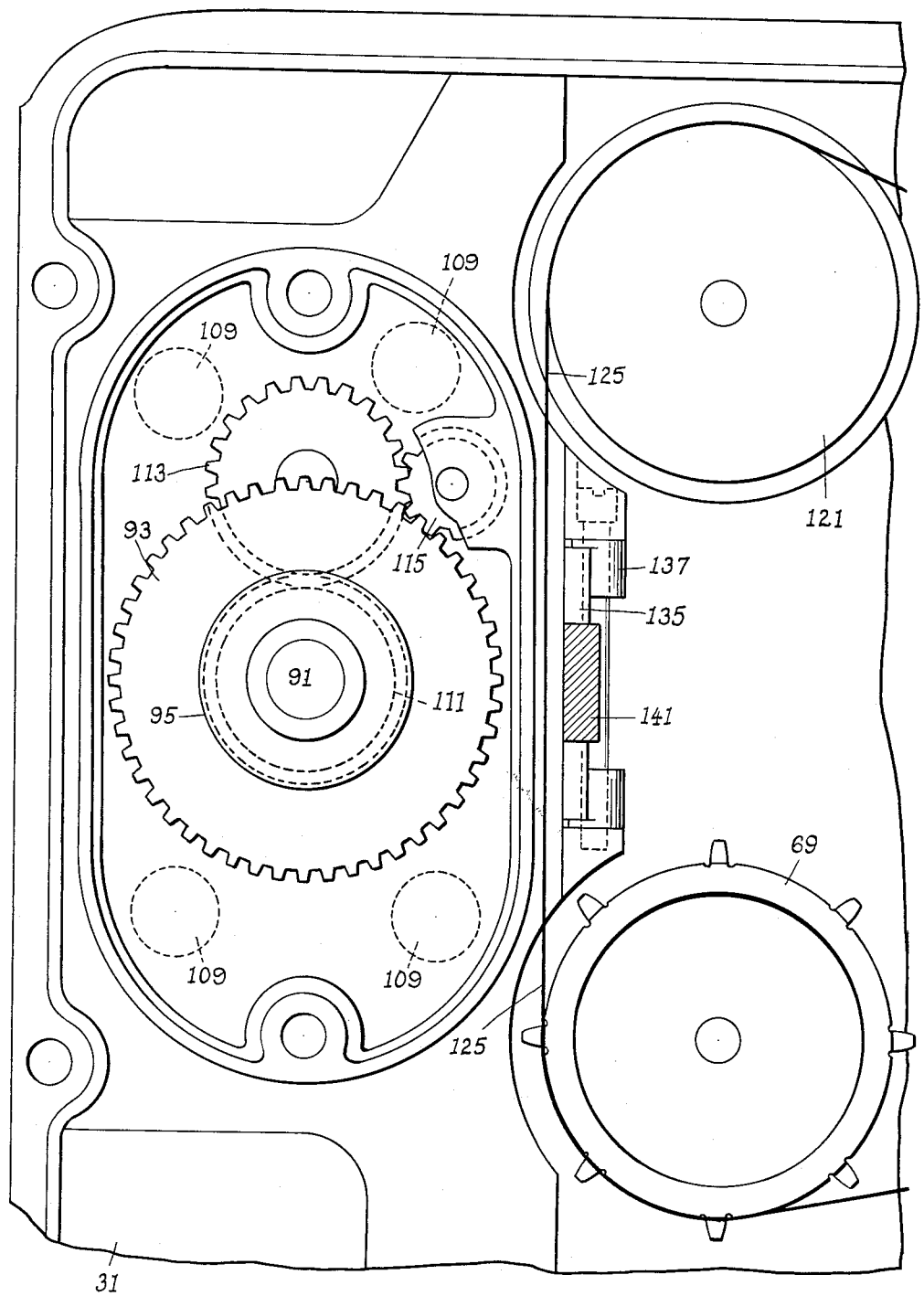
FIG. 4 is a fragmentary elevation of the drive gears for the prism housing and shutter drum, showing also the film sprocket and the film idler.
Figure 5:
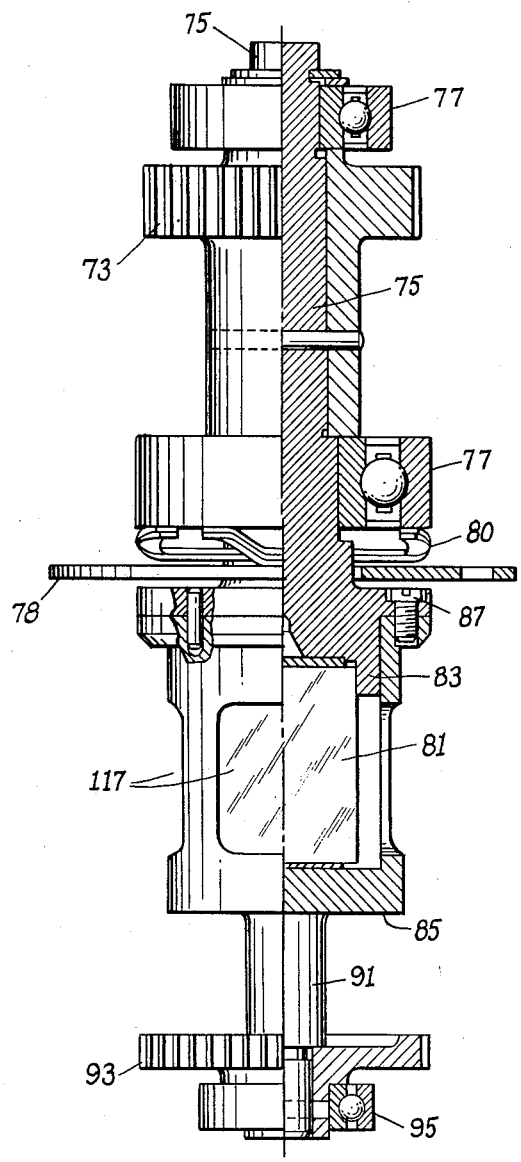
FIG. 5 is a view half in elevation and half in axial section of the prism shaft and housing assembly.

The prism assembly and the shuttering mechanism may best be understood by referring to FIGS. 3, 4, and 5 in conjunction with FIG. 2. The above mentioned gear 71 meshes with and drives a gear 73 on the prism shaft 75 which is supported from ball bearing 77 which, in turn, are mounted in a bearing sleeve or insert 79 within the housing section 31. One of these bearings is approximately at the far end of the prism shaft 75, and the other is at an intermediate point on the shaft. Spaced a little from the near side of this second bearing 77 is a plate 78 perpendicular to the prism shaft axis and held by screws in a fixed position relative to the fixed parts of the camera casing. A spring washer 80 is held by this plate 78 and presses against the outer ball race of the bearing 77, to eliminate all axial play of the shaft 75.

Closer to its near end, the shaft carries the optical prism 81 mounted at its far end in a socket formed by the enlarged portion 83 of the prism shaft 75. The near end is mounted within a hollow housing member 85 which telescopes axially around the housing portion 83 of the prism shaft, fitting snugly thereon as best seen in FIG. 3, and is held firmly in place thereon by screws 87. The near end of this member 85 is extended to form a shaft portion 91 coaxial with the prism shaft 75, to which is fixed at its near end the shutter drive gear 93, the hub of which drive gear is firmly mounted in a ball bearing 95 which in turn is mounted in a recess in a cap member 97 secured in and supported by stationary structure 99.

Close to its far end, this stationary member 99 has internally fixed to it, as by internal screw threads, a bearing ring 101 which rotatably supports the far end of a shutter drum 103 which surrounds the rotating prism parts 83 and 85 slightly spaced therefrom as well seen in FIG. 3. The near end of this shuttering drum 103 is of reduced diameter and is rotatably supported in a bearing ring 105 held by a stationary support plate 107 which in turn is supported by stationary supporters 109 from a fixed flange 110 on the stationary structure 99.

On the reduced diameter portion at the near end of the shuttering drum 103, gear teeth 111 are integrally formed. These teeth mesh with the teeth of an idler gear 113 (FIG. 4) which in turn meshes with a wide face idler pinion 115, the pinion meshing also with the drive gear 93 previously mentioned.

In the preferred construction, the drive gear 93 is four times the diameter of the pinion 115, so the pinion will rotate four times as fast as the drive gear and the prism shaft. The idler gear 113 is twice the diameter of the pinion 115, so will rotate half as fast as the pinion, or twice as fast as the prism shaft. The gear 111 formed on the shuttering drum is the same diameter as the idler gear 113, so that the shuttering drum 103 will rotate at twice the speed of the prism shaft carrying the prism 81, but in the opposite direction.

The optical prism 81 is preferably of square cross section, and the housing 83, 85 which holds this prism and rotates with it is provided with four windows or apertures 117 opposite the four sides of the prism. The shuttering drum 103 has two windows or apertures 119 at diametrically opposite points. The shuttering drum, through the gearing described, is oriented with the prism and its drum in such manner that when two sides of the prism are parallel to the optical axis and two sides perpendicular to the optical axis, the limiting edges (top and bottom edges) of the windows in the prism drum and in the shuttering drum will be centered or symmetrical with respect to the optical axis.

Since the shuttering drum rotates twice as fast as the prism, and in the opposite direction, it follows that when the prism is turned from what may be called the alined position (with two faces parallel and two faces perpendicular to the optical axis) so as to cause increasing deflection of the beam of light from the optical axis, the trailing edge of the windows 119 in the shuttering drum will cut off the advancing edge of the beam of light deflected by the prism, and thus will serve to limit the deflection of the light to that portion of the travel of the prism in which a reasonably accurate and undistorted or true image is projected onto the film. By the time the prism 81 has rotated through 90° so that another face of the square prism takes the place of the first face, the shuttering drum has rotated through 180° so that the masking windows or apertures 119 in the shuttering drum are again in proper position for limiting the next image.

The use of this shuttering drum rotating in the opposite direction from the prism, and at twice the speed of the prism, results in a considerable improvement of image quality, by blocking off the light rays having excessive obliqueness with respect to the optical axis, and by enabling the use of much larger windows 117 in the prism housing 83, 85 than would otherwise be permissible, thus minimizing or eliminating vignetting at the top and bottom of each frame of the film. This is achieved in a relatively simple way by mechanism which is sturdy and compact and is well able to withstand severe shocks and stresses such as those previously mentioned.

The light entering the camera, in a direction from left to right when viewed as in FIG. 2, comes through the lenses in the lens mount, then through the prism and shuttering mechanism, and falls upon the film which is to the rear (to the right, as seen in FIG. 2) of the shuttering mechanism. In certain cameras of this general type (the continuously moving film type) the image is laid on the film while the film is in a curved condition, passing around a roller or sprocket. An example of this is the camera shown in said copending patent application, Serial No. 523,171. A similar arrangement may be used in the present camera if desired. However, it is preferred in the present camera to place or lay the image on the film while the film is in a flat condition rather than in a curved condition. Therefore, the above mentioned film sprocket 69 is no longer located on the optical axis (as was the case with the film sprocket in said copending application, Serial No. 523,171) but it is offset below the optical axis as seen in FIGS. 1 and 4. A film idler roller 121 is located vertically above the sprocket 69 and above the optical axis. As the film comes from the film magazine (to be partially described below) it assumes the position shown at 125 in FIGS. 1 and 4, first passing over a small guide roller 127 which is part of the removable magazine structure, thence extending tangentially to the top of the idler roller 121, thence downwardly from the front edge of the idler roller 121 to the front edge of the sprocket 69, this portion between the idler roller 121 and the sprocket 69 being the flat focal plane portion on which the image is laid. After passing partially around the sprocket 69 which serves to drive the film in synchronous timed relation to the rotation of the prism shaft 75, the film 125 passes over another guide roller 129 which, like the roller 127, forms part of the removable magazine structure, and then passes to the take-up reel or spool in the magazine.

As it travels through the focal plane, the film is accurately held in flat condition and in proper spacing from the axis of rotation of the optical prism, by means of a film gate, the forward stationary side of which is formed by vertically extending and highly polished surfaces 131 (FIG. 3) on the rear side of the stationary support or housing 99 of the prism assembly. The film gate has, of course, an optical aperture window 133 through which the light passes to the front or emulsion face of the film 125. At its edges, the front face of the film runs on the above mentioned highly polished tracks or runways 131, and is held against them by the movable member or backing plate 135 (FIG. 2) of the film gate, which is a sturdy and rigid member hinged at 137 at its far edge to the stationary member 99. The near edge of the film gate member 135 is beveled as at 139 (FIG. 2) to cooperate with a beveled latch member 141 slidable horizontally in a direction transverse to the optical axis, on a headed stud 143 screwed into the stationary member 99, a small leaf spring 145 being mounted on the stud between the latch member 141 and the stationary member 99, to engage the latch member and press it rearwardly to prevent chatter. The outer end or near end of the latch member 141 has an enlarged head 147 in tight contact with the inner face of the closure door 153 of the camera, which closure door is hinged at 155 to the main camera housing, or body 31. When the door 153 is opened, the knob or head 147 of the latch 141 may be pulled outwardly to disengage the inner end or far end of the latch from the beveled portion 139 of the film gate member 135, thus allowing the film gate member to be swung rearwardly on its hinge 137 for the purpose of threading the film. After the film is threaded, the member 135 is swung to its normal or shut position, and the latch 141 is thrust inwardly to engage tightly on the beveled part 139 of the film gate member, holding the film gate member tightly in normal position.

The front face of the film gate member, which bears against the rear face of the film, is highly polished. As will be seen in FIG. 2, this front face is slightly raised in the portion which extends across the width of the film, so that this portion alone may be highly polished without unnecessarily polishing the lateral edges of the member 135, on each side of the raised portion. But these lateral edges, beyond the raised portion, are accurately machined, even though not highly polished, and when the film gate is closed, these lateral edges have a firm bearing of substantial area against the rear face of the stationary housing 99, thus (in conjunction with the wedging action of the latch 141) accurately positioning the film gate member 135 relative to the polished tracks 131 which engage the lateral edges of the front face of the film. The parts are dimensioned so that the space between the film tracks 131 and the raised part of the gate member 135 is very close to but just a little greater than the thickness of the film which is to be used in the camera. If, for example, the photographic film has a thickness of 0.006 of an inch, the parts are preferably dimensioned so that the thickness of the film gtae is approximately 0.008 of an inch, thus leaving a slack space of approximately 0.002 of an inch. Such a film gate will hold the film in the focal plane with a sufficient degree of accuracy for practical purposes, yet will not actually produce pressure in a direction through the thickness of the film, which pressure would not only slow down the desired high speed rate of travel of the film but also would be likely to cause damage to the film at the high speed employed in a camera of this kind.

Referring now to the magazine assembly 41 (best shown in FIG. 1) this is held to the main body of the camera by the screws 43, as already mentioned above. The near side of the magazine is closed by a door 160 hinged at the top on hinge pivots 162 and latched at the bottom by a rotatable latch member 164 containing a finger bar 166 by which the member 164 may be turned to engage an interior latch arm with or disengage it from a suitable slot in a fixed part of the magazine.

The magazine contains two shafts extending in a general direction transverse to the optical axis but not intersecting the optical axis, the shafts preferably lying in a common horizontal plane somewhat above the optical axis. The first or forward one of these shafts is indicated in dotted lines at 171 in FIG. 1, and is a stationary shaft supported in cantilever fashion from its far end (that is, the end remote from the door 160) and carries a spool receiving hub 173 rotatable on the shaft 171, and a frictional brake to make slight resistance to rotation of the hub. The second shaft 175 is the driven shaft of the take-up or rewinding spool, and is suitably supported in a manner the details of which are not important for purposes of the present invention, and suitably driven from the above mentioned rear drive shaft at the rear end of the motor 51.

The hub 173 on the film supply shaft 171, and the hub 195 on the film take-up shaft 175, are of equal outside diameter, and are adapted interchangeably to receive, with a light press fit, the film spools 225, which in this instance are of the rimless or flangeless type. Due to the requirements for extreme compactness, the center to center distance between the shafts 171 and 175 is less than the diameter of the roll of film on a full spool 225; therefore the usual side flanges on the spool are omitted, to enable the desired compact arrangement. Of course when the supply spool is full, the take-up spool or rewind spool is empty or substantially so, and vice versa. Because of the absence of side flanges on the film spool, and because of the severe forces to which the parts may be subjected when the camera is mounted, e.g., on a fast moving guided missile, it is necessary to provide structure to prevent lateral displacement of the film from the spool, as such displacement would cause the edges of the film to rub against the sides of the magazine and prevent proper feeding movement of the film.

To this end, the magazine is provide with rollers 231 (FIG. 1) rotatable on shaft arranged radially with relation to the respective shafts 171 and 175, in such position that the rollers will engage the edges of the roll of film if any convolutions thereof attempt to become displaced in directions axially of the shafts 171 and 175. Preferably there are three of these guide rollers 231, arranged radially with respect to the shaft 171 at intervals of 120 degrees from each other, mounted on the far wall of the magazine to engage the far side of the film supply roll, and three more such rollers mounted on the inner face of the magazine door 160 to engage the near side of the film supply roll. Likewise there are three such guide rollers mounted on the inner face of the far wall of the magazine in radial relationship to the take-up shaft 175, for engagement with the take-up roll of film, and three more mounted on the inner face of the door 160 in similar relationship to the take-up roll of film.

From the film supply spool mounted on the shaft 171, the film follows the general path indicated in FIG. 1, at 125, passing over the guide roller 127, thence to the idler roller 121, thence straight downwardly through the film gate and focal plane to the drive sprocket 69, thence rearwardly over the guide roller 129, to a roller 241 mounted near the bottom of the magazine approximately midway between the two shafts 171 and 175, and thence upwardly from this guide roller 241 to the core or spool 225 on the shaft 175.

For holding the door 153 closed, there is a rotatable latch member 335 on the access door 153 of the main camera body, which door is hinged on the hinges 155 previously mentioned. This latch member 335 is fixed to the inner end of a stud 337 extending through the door 153, the head 339 of the stud lying at the outer face of the door and having therein a coin slot or screwdriver slot 341 by which the stud and the latch arm 335 may be turned to swing the latter upwardly and leftwardly when the door 153 is to be opened for threading the film, and downwardly and rightwardly when the door is closed at the end of a film threading operation. The closing motion of the latch 335 brings the latch against the inner face of the body of the camera as shown in FIG. 2, holding the door 153 tightly shut.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising means for advancing film continuously, means for projecting a beam of light toward the moving film, an optical prism interposed in the path of said beam and rotating in synchronism with the advancing movement of the film, a shuttering drum surrounding said prism and rotating coaxially therewith, said drum having light transmitting apertures enabling passage of said beam of light through said prism and drum when they are in certain positions relative to each other and serving to block passage of said beam of light to said film when said prism and drum are in certain other positions relative to each other, means for rotating said prism in one direction, and means for rotating said drum in the opposite direction from the rotation of said prism and at twice the speed of rotation of said prism.

2. A construction as defined in claim 1, in which said prism has four sides and is mounted in a housing rotating with the prism and having four light-transmitting apertures respectively opposite the four sides of the prism, and in which said shuttering drum surrounds said prism housing and has only two light-transmitting apertures at diametrically opposite sides of the drum.

References Cited in the file of this patent

UNITED STATES PATENTS

| | | |
|---|---|---|
| 708,303 | Bianchi | Sept. 2, 1902 |
| 1,192,666 | Meushaw | July 25, 1916 |
| 1,341,108 | Burnett | May 25, 1920 |
| 1,372,619 | Hochstetter | Mar. 22, 1921 |
| 1,397,817 | Mladinich | Nov. 22, 1921 |
| 1,646,341 | Baradat | Oct. 18, 1927 |
| 1,854,742 | Jenkins | Apr. 19, 1932 |
| 1,864,100 | Steiner | June 21, 1932 |
| 1,953,985 | Kindelmann et al. | Apr. 10, 1934 |
| 2,008,973 | Tuttle | July 23, 1935 |
| 2,103,369 | Howell | Dec. 28, 1937 |
| 2,149,218 | Heinishch et al. | Feb. 28, 1939 |
| 2,223,525 | Miller | Dec. 3, 1940 |
| 2,225,021 | Schwenk | Dec. 17, 1940 |
| 2,252,563 | Githens et al. | Aug. 12, 1941 |
| 2,353,044 | Kriegsheim | July 4, 1944 |
| 2,357,076 | Briskin et al. | Aug. 29, 1944 |
| 2,372,637 | Williamson et al. | Mar. 27, 1945 |
| 2,417,076 | Hickman | Mar. 11, 1947 |
| 2,449,626 | Suthann | Sept. 21, 1948 |
| 2,449,705 | Jones | Sept. 21, 1948 |
| 2,629,646 | Warrick | Feb. 24, 1953 |
| 2,728,263 | Schmitt et al. | Dec. 27, 1955 |

FOREIGN PATENTS

| | | |
|---|---|---|
| 499,629 | Great Britain | Jan. 26, 1939 |